Patented Nov. 2, 1943

2,333,133

UNITED STATES PATENT OFFICE 2,333,133

TREATMENT OF MUD-LADEN DRILLING FLUIDS

Truman B. Wayne, Houston, Tex.

No Drawing. Application March 31, 1939,
Serial No. 265,148

7 Claims. (Cl. 252—8.5)

This invention relates generally to the treatment of mud-laden drilling fluids, and particularly to the treatment of such fluids as are employed in the rotary drilling of oil and gas wells so as to improve the physical properties of said fluids.

The fluid employed for rotary drilling operations contains a gel-forming component and may be made from the natural clay which occurs at the location or may be synthetically compounded from the clay and mud bases of commerce, including bentonite and beidellite. Such fluids may also contain a heavy substance such as barytes, iron oxide, or the like, for increasing the specific gravity of the fluid.

Such fluids as are synthetically compounded may be controlled as to viscosity by a proper variation of the colloidal content, but when the cuttings from the bore hole become entrained in the fluid, its composition has changed, and further control is often necessary in order to maintain the desired viscosity but at the same time to permit the cuttings to settle out and render the fluid of such character that it will not be susceptible to gas cutting. With fluids which are compounded with the clay at the location, it is obvious that such control is more difficult.

It is an object of the present invention, generally stated, to provide a process and agent for the treatment of mud-laden drilling fluids in order to control the viscosity and thixotropic properties thereof.

Another object of the invention is to provide a process and agent for treating such fluids whereby the properties of the hydrated clay colloids are modified and the viscosity of the fluid reduced.

A further object of the invention is to provide a mud-laden drilling fluid and the process of making it in which the properties of the colloidal matter in the fluid are substantially modified and rendered suitable for rotary drilling purposes.

A more specific object of this invention is to provide a process and agent for the treatment of mud-laden drilling fluids from a class of chemical reagents, and a treatment wherein a member of said class of chemical reagents is used, and a drilling fluid which has been suitably modified by said treatment, as will hereinafter be described.

Other objects will become apparent to those skilled in the art when the following description is read.

In accordance with the present invention, generally stated, a mud-laden fluid such as that employed in the rotary drilling of oil wells may be treated with a chemical agent which, upon reaction with certain constituents of the fluid, modifies the colloidal properties of the colloidal matter in the fluid. More specifically, in accordance with the present invention, the degelling action on a mud-laden or drilling fluid is produced by a class of chemical substances which may be generally described as "electronegative organic bodies." This may be accomplished by treatment with chemicals so selected that the negative electrical charge is increased on the clay particles of the drilling fluid by adsorption and/or chemical reactions occurring between the negatively charged clay particles and certain electronegative organic bodies which will hereinafter be described. The electronegative particles which are herein termed "clay particles" are, of course, colloidal fractions of hydrated aluminosilicate or silico-aluminate complexes derived from clay, bentonite, beidellite, or other clay substances. In many instances the electronegative qualities of the clay particles are simply increased through adsorption of the electronegative organic bodies hereinafter described, but in many instances, particularly where the electronegative organic bodies have the property of combining with polyvalent metals to form salts, profound chemical changes within the structure of these clay particles may also accompany the adsorption of these electronegative organic bodies. In such instances the action of these electronegative organic bodies may parallel to some extent the action of the reagents described in my co-pending application, Serial No. 24,083, filed May 29, 1935, which generally discloses degelling agents and a process of using same wherein polyvalent metals originally present in the clay complexes are reacted upon and removed from the gel structures, thus producing a change in the hydration capacity and viscosity characteristics of the colloidal fraction of the mud-laden or drilling fluid so treated. Many of the electronegative organic bodies herein disclosed are strongly acidic and will tend to react with calcium and/or magnesium ions present in solution in the aqueous phase or chemically combined in the colloidal phase of mud-laden or rotary drilling fluids. Moreover, being strongly electronegative, they possess an excess of electrons and are capable of capturing electrons from substances with which they come in intimate contact.

The action of the electronegative organic bodies herein described should not be confused with the adsorption of negatively charged hydroxyl ions from inorganic bases such as sodium hydroxide, sodium carbonate, trisodium phosphate, commercial sodium silicate solutions, and the like. While, for instance, the hydroxyl ion is negatively charged and is, therefore, capable of adsorption by electronegatively charged bodies such as clay particles without causing flocculation, the accompanying cation, for instance, the sodium ion present in sodium hydroxide, is strongly electropositive. It, therefore, tends to neutralize the functional effect of the hydroxyl ion during deflocculation. The phenomenon is commonly recognized in attempts to deflocculate clays by means of alkalies as often the reverse effect is obtained due to swelling of the clay particles in the presence of the alkaline substance. On the other hand, a sodium salt of a strongly negative organic substance will not cause reversion and swelling in the manner so commonly noted when alkalies are used as deflocculating agents.

Sodium salts of such electronegative organic bodies may undergo base exchange reactions with some of the calcium and/or magnesium bearing silicate complexes wherein the sodium ion of the electronegative organic body is exchanged for the polyvalent calcium or magnesium ion of the silicate complex. However, the silicate complex is still electronegative in character and the calcium salt of the electronegative organic body will be strongly adsorbed by the silicate complex, thus tending to augment its electronegative properties. Of course, the properties of the silicate complex have been modified through the exchange of cations and this, in itself, will effect a lowering of the viscosity of the drilling fluid containing these clayey bodies. Additionally, there is the added dispersing effect of the strongly adsorbed electronegative organic body and the combination of these two factors produces a marked and desirable effect on the physical properties of the mud-laden or rotary drilling fluid.

Owing to the complexity of these various hydrous alumino-silicates and silico-aluminates present in the colloid fraction of mud-laden or drilling fluids and also to the complex electronic structure of the electronegative organic bodies used in the present invention, the possibility of reactions occurring through secondary valences, covalent linkages, etc., should not be overlooked in addition to the well known reactions occurring through primary valences. Thus certain reaction products may be produced through addition or covalent linkage reactions which profoundly modify the physical properties of the orginal gelatinous colloids within the mud-laden or drilling fluid.

A wide range of organic substances meet the generic descriptive term "electronegative organic bodies" herein used to describe an important characteristic of my new treating agents. Among suitable materials are the acidic dyestuffs which usually contain phenolic groups or residues together with other acidic groups or residues and usually containing hydroxyl, carboxyl and/or sulfonic groups or their neutralized equivalents.

Suitable examples of such electronegative organic bodies derived from the class of substances known as dyestuffs or dyestuff intermediates are members of the hydroxy anthraquinone or alizarine dyes. They are all phenolic substances and hence acidic dyes, and are characterized by the presence of at least two hydroxyl groups in the molecule. They are characterized by their ability to produce "lakes" with oxides of aluminum, iron, and other metals. As specific examples of such materials, the following electronegative dyestuffs may be mentioned:

Alizarin yellow C (gallacetophenone)
Alizarin yellow A (trihydroxybenzophenone)
Flavopurpurin (1:2:6-trihydroxyanthraquinone)
Anthrappurpurin (1:2:7-trihydroxyanthraquinone)
Purpurin (1:2:4-trihydroxyanthraquinone)
Anthragallol (1:2:3-trihydroxyanthraquinone)
Alizarin Bordeaux B (1:2:6:8-tetrahydroxyanthraquinone)

Numerous sulfonic acids of the above mentioned dyestuffs are also suitable; for instance:

Alizarin red S, sodium (1:2-dihydroxyanthraquinone-3-sulfonate)
Alizarin SSS, sodium (1:2:6-trihydroxyanthraquinone sulfonate)

Dyestuffs of the aurine series, such as chrome violet (aurine tricarboxylic acid) and certain members of the rosaniline series, such as alkali blue (sodium salt of triphenyl rosaniline sulfonic acid) as well as sulfonated derivatives of various basic dyes, are also suitable. Dyestuffs which would be basic without sulfonation are often converted by sulfonation into acidic dyes possessing electronegative characteristics, hence are suitable for my purpose. On the other hand, basic dyestuffs such as Methylene Blue, Night Blue, and similar compounds which are electropositive in character are not suitable for my purpose.

Various carboxylic hydroquinone derivatives such as gentisic acid, 2:5 dihydroxy terephthalic acid, and similar compounds are of value if sufficiently water soluble. Usually the solubility of these carboxylic derivatives is enhanced by converting them into their corresponding alkali metal, ammonium, or water-soluble amine salts. In like manner the various hydroxy-anthraquinone carboxylic acids may be employed.

Substances such as gallein, fluorescein, phenolsulfonephthalein, hydroquinonephthalein, and other members of the phthalein or eosin dye group are of value in the form of water soluble salts.

Glucosides and other soluble esterified derivatives of the above mentioned carboxylic compounds are also contemplated.

Among simpler electronegative organic bodies are intermediates and chemicals such as hydroquinone, hydroxyhydroquinone, sulfo salicylic acid, sulfo succinic acid, phthalic acid (preferably in the form of its acid salt), maleic acid and its water soluble derivatives, alkyl glucosides, and similar electronegative organic materials of relatively high molecular weight. Generally, such reagents should be of relatively high molecular weight, surface active and hydrophilic in character, as well as being electronegative in character.

The electronegative qualities of any proposed reagent may be determined by adding it to a suspension of a definitely electropositive colloid in water and noting the migration of the adsorption product in an electrophoresis apparatus. For instance, a suspension of carefully washed hydrous aluminum oxide or hydrous ferrous oxide can be made in water and subjected to the action of an electric current in an electrophoresis cell. The electropositive colloid will migrate to the cathode, or negative pole. However, if to this suspension of an electropositive colloid is added a small quantity of an electronegative substance such as one of the acidic dyestuffs herein disclosed, the migration of the colloid to the cathode will be slowed down, ultimately stopped, and finally reversed so that it will migrate to the anode, or positive pole, upon the addition of an excess of the electronegative chemical.

The colloids present in clays and clay-like substances are usually electronegative in character. If through treatment with excesses of caustic alkalies, etc., the particles are temporarily electropositive, they may readily be changed to their original electronegative state by the addition of an acidic substance to the drilling fluid which will combine with the alkaline substances and thereby liberate the original electronegative clay particles from their alkaline adsorption product. For practical purposes, therefore, we may always consider there clayey products as possessing an electronegative charge and through the addition of electronegative organic bodies herein disclosed, the electronegative properties of these clayey particles are augmented, resulting in a greater dispersion and resultant thinning and stabilization of the colloidal component of the mud-laden or drilling fluid. Inert materials such as sand, cuttings, etc., as well as occluded or emulsified gases, are readily released as a result of this treatment.

Some of the electronegative organic bodies hereinabove disclosed are only slightly soluble in water in the free state but can readily be made more water soluble by converting them to their corresponding alkali metal, ammonium, or alkylolamine salts. Whereas water solubility is usually desirable, apparent insolubility may not be important for the reason that most of these reagents possess sufficient solubility to dissolve in the proportions required in the treating process herein described.

In order to illustrate the principles of my invention, a number of specific examples are hereinafter given. However, it should be distinctly understood that I do not confine myself to the specific treating agents, drilling fluid compositions or proportions hereinafter disclosed, as it should be understood by those skilled in the art that variations from these disclosures do not depart from the principles and spirit of my invention which is directed in a general way to the use of electronegative organic bodies in the degelling and controlling of the viscosity of mud-laden or rotary drilling fluids.

In the examples given the application of the reagent is illustrated in connection with a drilling fluid composed of Wyoming bentonite and water in which the bentinite is about 8% by weight of the fluid. Such a drilling fluid is useful in drilling and as prepared has a viscosity of 48 centipoises by a Stormer viscosimeter at 600 R. P. M.

Example 1

100 milliliters of a drilling fluid having an initial viscosity of 48 centipoises were treated with 0.1 gram of alizarine (1:2-dihydroxyanthraquinone) as a sodium salt dissolved in 2 milliliters of water. The viscosity of the treated drilling fluid was 30 centipoises. Increasing the proportion of reagent to 0.2 gram further reduced the viscosity to 25 centipoises.

Example 2

100 milliliters of a drilling fluid having an initial viscosity of 48 centipoises were treated with 0.1 gram of purpurin (1:2:4-trihydroxyanthraquinone) as a sodium salt dissolved in 2 milliliters of water. The viscosity of the treated drilling fluid was 28 centipoises. Increasing the proportion of reagent to 0.2 gram further reduced the viscosity to 23 centipoises.

Example 3

100 milliliters of a drilling fluid having an initial viscosity of 48 centipoises were treated with 0.1 gram of anthragallol (1:2:3-trihydroxyanthraquinone) as a sodium salt dissolved in 2 milliliters of water. The viscosity of the treated drilling fluid was 25 centipoises. Increasing the proportion of reagent to 0.2 gram further reduced the viscosity to 21 centipoises.

In all of the above specific examples just sufficient NaOH was added to dissolve the reagent in the proportion of 0.1 gram in a volume of 2 ml. of water. The exact sodium salt so formed was not determined.

These electronegative organic bodies may be used in proportions ranging from .01 gram to 1.0 gram per 100 milliliters of drilling fluid, depending on the initial viscosity and other characteristics of the drilling fluid. Usually final viscosities of from 25 to 35 centipoises are considered desirable.

These electronegative organic bodies may be used alone, as shown in the preceding examples, or with other chemical treating agents such as alkalies, tannins, sulfite liquors from paper manufacture, and the various phosphates, borates, silicates, etc.

The preceding examples exemplify the use of my improved degelling agents on a normal mud-laden drilling fluid prepared in the usual manner from natural or synthetic mud-making materials. The relatively small proportions disclosed are normally sufficient to obtain a satisfactory treatment. However, if it is desired to add larger quantities of gel-forming materials such as bentonite, it is also necessary to use larger proportions of the treating agent, usually from 0.5 to 2.5 per cent, or even higher, based on the weight of the drilling fluid. The excess of treating agent reduces the gel-forming properties of the excess bentonite or other material added, and thus allows larger proportions of gel-forming material to water than normally can be incorporated in the drilling fluid. For instance, wherein a normal 8 per cent suspension of bentonite in water may have a viscosity of 48 centipoises in the Stormer viscosimeter at 600 R. P. M., if the drilling fluid contains as much as 2 per cent of the treating agent, very much larger quantities of bentonite may be incorporated without unduly increasing the viscosity. In fact, fluid muds may thus be prepared from bentonite which approximate the solids composition of muds prepared from natural sources.

It is likewise obvious that muds which have become contaminated with cement, calcareous shales, and/or other sources of polyvalent metal compounds which have produced abnormal viscosities, will require heavier treatments with my improved treating agent to produce normal viscosities for muds so contaminated.

Tannins and tannin-like bodies of high molecular weight, when used alone or in acidic media, are electronegative in character. If used in strongly alkaline solutions such as is disclosed in Lawton, Loomis and Ambrose Patent Number 1,999,766, they do not function as electronegative bodies. However, tannins are specifically excluded from the coverage of the present application, as their action on the constituents of a drilling fluid is best explained by other principles if used in either alkaline or acid media.

The term "electronegative organic body" as used in the appended claims is intended to cover all other organic substances of relatively high molecular weight exclusive of the tannins and tannin-like bodies, which are electronegative in character due to the presence of strongly electronegative phenolic, carboxylic, sulfonic and/or other group or groups within their molecular structure. Aside from their electronegative character, they may possess other functional properties peculiar to certain groups within their structure, such as the ability to precipitate or control the ionization of polyvalent alkaline-earth metal salts, hydrates, etc., surface activity, etc.

The term "modified gel constituent" used in the claims is descriptive of the component part of a well drilling fluid produced by adsorption-reactions occurring between gel-forming constituents of the drilling fluid and electronegative dyestuff materials of the type herein contemplated. The term "adsorption-reaction product" refers to the product of such adsorption reactions, of whatever nature, and whether of purely chemical or physico-chemical origin. While differences in opinion may exist as to the nature of the action of degelling agents on gel constituents of well drilling fluid, it is generally agreed that adsorption of viscosity-reducing chemicals initially occurs at the surface of the clay particles in contradistinction to the ionic effects produced in such clay-water systems by ordinary chemical salts. The amphoteric nature of the complex compounds of aluminum and silicon, and similar metallic substances having more than one valence, which comprise the gel-forming constituents of well drilling fluids, suggests that under adsorption conditions secondary valence reactions may occur in addition to primary valence reactions of the usual type when degelling agents of the type herein disclosed are used.

While in the foregoing, theories are advanced, these are put forward to facilitate the understanding of the objects and purposes of this invention; it is to be understood, however, that this invention is not dependent upon or limited to any theory put forward.

I claim:

1. A modified gel constituent of a mud-laden well drilling fluid comprising substantially the adsorption-reaction product of a gel-forming constituent and an acidic dyestuff and characterized by the fact that it is wettable by and dispersible in a mud-laden drilling fluid.

2. A modified gel constituent of a mud-laden well drilling fluid comprising substantially the adsorption-reaction product of a gel-forming constituent and an acidic dyestuff characterized by the presence of at least two hydroxyl groups in the molecule and characterized by the fact that it is wettable by and dispersible in a mud-laden drilling fluid.

3. A modified gel constituent of a mud-laden well drilling fluid comprising substantially the adsorption-reaction product of a gel-forming constituent and an acidic dyestuff of the hydroxy-anthraquinone series and characterized by the fact that it is wetable by and dispersible in a mud-laden drilling fluid.

4. A modified gel constituent of a mud-laden well drilling fluid comprising substantially the adsorption-reaction product of a gel-forming constituent and an acidic dyestuff of the aurine series and characterized by the fact that it is wettable by and dispersible in a mud-laden drilling fluid.

5. A modified gel constituent of a mud-laden well drilling fluid comprising substantially the adsorption-reaction product of a gel-forming constituent and an acidic dyestuff of the rosaniline series and charactedized by the fact that it is wettable by and dispersible in a mud-laden drilling fluid.

6. A mud-laden drilling fluid for wells containing a small percentage of an agent comprising an acidic dyestuff.

7. The process of controlling the viscosity of mud-laden well drilling fluids comprising adding thereto a small percentage of an agent comprising an acidic dyestuff.

TRUMAN B. WAYNE.